US010178277B2

(12) United States Patent
Sakamoto (10) Patent No.: US 10,178,277 B2
(45) Date of Patent: Jan. 8, 2019

(54) INFORMATION PROCESSING APPARATUS, SETTING CONTINUATION METHOD AND NON-TRANSITORY COMPUTER-READABLE RECORDING MEDIUM ENCODED WITH SETTING CONTINUATION PROGRAM

(71) Applicant: Konica Minolta, Inc., Chiyoda-ku, Tokyo (JP)

(72) Inventor: Kenji Sakamoto, Nishinomiya (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/461,941

(22) Filed: Mar. 17, 2017

(65) Prior Publication Data

US 2017/0280021 A1    Sep. 28, 2017

(30) Foreign Application Priority Data

Mar. 24, 2016  (JP) .................................. 2016-060141

(51) Int. Cl.
*G06F 15/00*     (2006.01)
*H04N 1/44*      (2006.01)
(Continued)

(52) U.S. Cl.
CPC ......... *H04N 1/4433* (2013.01); *H04B 13/005* (2013.01); *H04N 1/0097* (2013.01);
(Continued)

(58) Field of Classification Search
CPC ......... H04N 1/4433; H04N 2001/0094; H04N 1/00917; H04N 1/4426; H04N 1/0097; H04B 13/005
(Continued)

(56) References Cited

U.S. PATENT DOCUMENTS

2008/0170258 A1   7/2008  Yamamura
2012/0062947 A1*  3/2012  Shozaki ............... G05B 19/409
                                          358/1.15

FOREIGN PATENT DOCUMENTS

CN    101232372    7/2008
CN    102253828    11/2011
(Continued)

OTHER PUBLICATIONS

First Office Action issued in corresponding Chinese Patent Application No. 201710178517.3, dated Oct. 31, 2018, with translation (26 pages).

*Primary Examiner* — Saeid Ebrahmi Dehkordy
(74) *Attorney, Agent, or Firm* — Buchanan Ingersoll & Rooney PC (57) ABSTRACT

An information processing apparatus includes an authenticator that authenticates a user, an operation acceptor that, during a period in which an operating user is logged in, accepts an operation by the operating user, a setter that sets a setting value, a log-out detector that detects log-out of the operating user, a setting value maintainer that, in the case where the log-out is detected, associates a setting value, which is set at a time point at which the log-out is detected, with the operating user, and a recoverer that, in the case where the operating user associated with the setting value stored is authenticated, sets a setting value to the setting value stored in the setting value maintainer, wherein the setting value maintainer, in the case where a user different from the operating user associated with the setting value stored is authenticated, does not delete the stored setting value.

36 Claims, 6 Drawing Sheets (51) Int. Cl.
*H04B 13/00* (2006.01)
*H04N 1/00* (2006.01)

(52) U.S. Cl.
CPC ....... *H04N 1/00917* (2013.01); *H04N 1/4426* (2013.01); *H04N 2201/0094* (2013.01)

(58) Field of Classification Search
USPC .............................................. 358/1.14–1.15
See application file for complete search history.

(56) References Cited

FOREIGN PATENT DOCUMENTS

| | | |
|---|---|---|
| CN | 102566946 | 7/2012 |
| CN | 104104815 | 3/2017 |
| JP | 2008-168588 A | 7/2008 |
| JP | 2014-021807 A | 2/2014 |
| JP | 2014-191402 A | 10/2014 |

\* cited by examiner

INFORMATION PROCESSING APPARATUS, SETTING CONTINUATION METHOD AND NON-TRANSITORY COMPUTER-READABLE RECORDING MEDIUM ENCODED WITH SETTING CONTINUATION PROGRAM

This application is based on Japanese Patent Application No. 2016-060141 filed with Japan Patent Office on Mar. 24, 2016, the entire content of which is hereby incorporated by reference.

BACKGROUND OF THE INVENTION

Field of the Invention

The present invention relates to an information processing apparatus, a setting continuation method and a non-transitory computer-readable recording medium encoded with a setting continuation program. More specifically, the present invention relates to an information processing apparatus that automatically detects the log-out of a user, a setting continuation method performed in the information processing apparatus and a non-transitory computer-readable recording medium encoded with a setting continuation program.

Description of the Related Art

In recent years, a technology for authenticating a user based on authentication information received from a portable device when an information processing apparatus becomes communicable with the portable device carried by the user has been known, and this technology can be applied to an information processing apparatus such as an MFP (Multi Function Peripheral). Because the user is authenticated by the MFP only by being close to the MFP 100 while carrying the portable device, an operation performed by the user for authentication can be simplified.

However, the user sometimes moves away from the MFP temporarily in the middle of an operation of the MFP. For example, it includes the case where the user carries sheets of paper to fill a tray in the MFP from another location or the case where the user forgets to bring a document for copying and returns to a desk to fetch the document. In this case, at a time point at which the MFP can no longer communicate with the portable device carried by the user, the MFP determines that the user is logged out and executes a log-out process. Generally, when executing the log-out process, the MFP changes a setting value, which is set by that time point, to a default value, so that the user must restart settings from the beginning at a time point at which the user logs in again.

Japanese Patent Laid-Open No. 2014-191402 discloses an information processing apparatus including a pseudo-log-out execution means that, in the case where a user requests to log out, cancels a process of log-out and creates a pseudo-log-out state by preventing an user operation and viewing of a screen while maintaining a log-in session, and a log-in request process means that, in the case where the user requests to log in after pseudo-log-out, confirms whether a pseudo-logged-out user matches the user who requests to log in, characterized in that the log-in request process means, in the case where the pseudo-logged-out user and the user who requests to log in are different from each other, requests an OS to execute a log-out process of the pseudo-logged-out user and a log-in process of the user who requests to log in.

However, in the case where another user logs in, the information processing apparatus described in Japanese Patent Laid-Open No. 2014-191402 executes the log-out process. Thus, in the case where the other user logs in, there is a problem that the setting value is erased. Meanwhile, in the case where the user sets the setting value and then allows the MFP to execute a process, the setting value is no longer necessary. In the case where the user allows the MFP to execute a process and then requests to log out, the unnecessary setting value is kept stored. Thus, there is a problem that a default setting value is not displayed in the case of the next log-in request.

SUMMARY OF THE INVENTION

According to one aspect of the present invention, an information processing apparatus includes a hardware processor that executes a process, the hardware processor includes an authenticator configured to authenticate a user, an operation acceptor configured to, during a period in which an operating user authenticated by the authenticator is logged in, accept an operation by the operating user, a setter configured to set a setting value used for execution of a process in accordance with the accepted operation, a log-out detector configured to detect log-out of the operating user, a setting value maintainer configured to, in the case where the log-out is detected by the log-out detector, associate a setting value, which is set by the setter at a time point at which the log-out is detected by the log-out detector, with the operating user for storage, and a recoverer configured to, in the case where the operating user associated with the setting value stored in the setting value maintainer is authenticated by the authenticator, set a setting value to the setting value stored in the setting value maintainer, wherein the setting value maintainer is configured not to, in the case where a user different from the operating user associated with the setting value stored by the setting value maintainer is authenticated by the authenticator, delete the stored setting value.

According to another aspect of the present invention, an information processing apparatus comprising a hardware processor that executes a process, the hardware processor includes an authenticator configured to authenticate a user, an operation acceptor configured to, during a period in which an operating user authenticated by the authenticator is logged in, accept an operation by the operating user, a setter configured to set a setting value used for execution of a process by a process executor in accordance with the accepted operation, a log-out detector configured to detect log-out of the operating user, a setting value maintainer configured to, in the case where the log-out is detected by the log-out detector with the operation by the operating user authenticated by the authenticator not completed, associate a setting value, which is set by the setter at a time point at which the log-out is detected by the log-out detector, with the operating user for storage, and configured not to, in the case where the log-out is detected by the log-out detector with the operation by the operating user authenticated by the authenticator completed, store the setting value set by the setter, and a recoverer configured to, in the case where the operating user associated with the setting value stored by the setting value maintainer is authenticated by the authenticator, set a setting value to the setting value stored by the setting value maintainer.

According to yet another aspect of the present invention, a setting continuation method includes an authentication step of authenticating a user, an operation acceptance step of, during a period in which an operating user authenticated in the authentication step is logged in, accepting an operation by the operating user, a setting step of setting a setting value used for execution of a process by an information processing apparatus in accordance with the accepted operation, a log-out detection step of detecting log-out of the operating user, a setting value maintaining step of, in the case where the log-out is detected in the log-out detection step, associating a setting value, which is set in the setting step at a time point at which the log-out is detected in the log-out detection step, with the operating user for storage, and a recovery step of, in the case where the operating user associated with the setting value stored in the setting value maintaining step is authenticated in the authentication step, setting a setting value to the setting value stored in the setting value maintaining step, wherein the setting value maintaining step includes a step of, in the case where a user different from the operating user associated with the setting value stored in the setting value maintaining step is authenticated in the authentication step, not deleting the stored setting value.

According to yet another aspect of the present invention, a setting continuation method includes an authentication step of authenticating a user, an operation acceptance step of, during a period in which an operating user authenticated in the authenticator is logged in, accepting an operation by the operating user, a setting step of setting a setting value used for execution of a process by an information processing apparatus in accordance with the accepted operation, a log-out detection step of detecting log-out of the operating user, a setting value maintaining step of, in the case where the log-out is detected in the log-out detection step with the operation by the operating user authenticated in the authentication step not completed, associating a setting value, which is set in the setting step at a time point at which the log-out is detected in the log-out detection step, with the operating user for storage, and in the case where the log-out is detected in the log-out detection step with the operation by the operating user authenticated in the authentication step completed, not storing the setting value set in the setting step; and a recovery step of, in the case where the operating user associated with the setting value stored in the setting value maintaining step is authenticated in the authentication step, setting a setting value to the setting value stored in the setting value maintaining step.

The foregoing and other features, aspects, and advantages of the present invention will become more apparent from the following detailed description of the present invention when taken in conjunction with the accompanying drawings.

DESCRIPTION OF THE PREFERRED EMBODIMENTS

Embodiments of the present invention will be described below with reference to drawings. In the following description, the same parts are denoted with the same reference characters. Their names and functions are also the same. Thus, a detailed description thereof will not be repeated.

Figure 1:
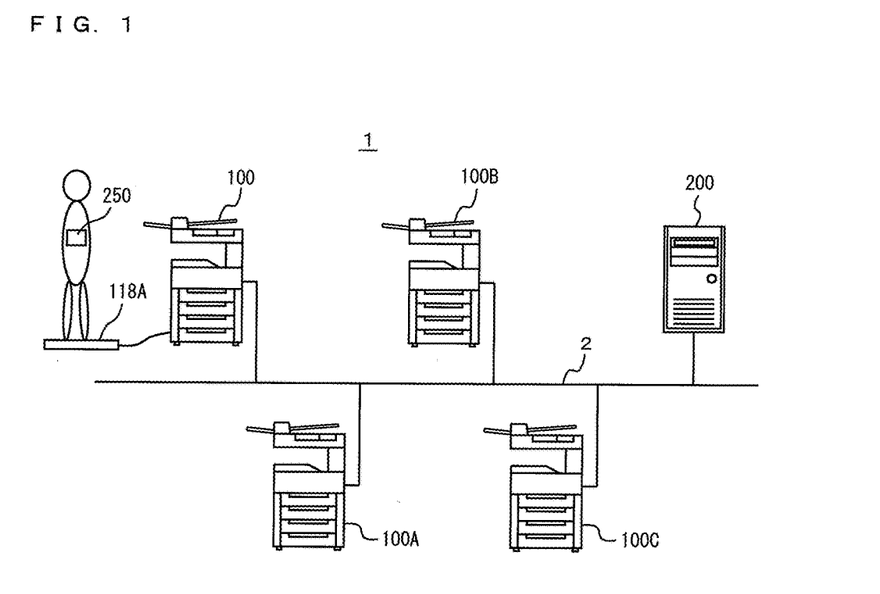
FIG. 1 is a diagram showing an overview of an image forming system in one embodiment of the present invention.

FIG. 1 is a diagram showing an overview of an image forming system in one embodiment of the present invention. Referring to FIG. 1, the image forming system 1 includes Multi-Functional Peripherals (hereinafter referred to as "MFPs") 100, 100A, 100B, 100C, an authentication server 200 and a portable device 250 that are respectively connected to a network 2. The MFP 100, 100A, 100B, 100C have the same configuration and functions, so that the MFP 100 will be taken as an example in the description here, unless otherwise specified.

The MFP (Multi Function Peripheral) 100 is one example of an information processing apparatus, includes a scanner for scanning a document, an image forming unit for forming an image on a recording medium such as a sheet of paper based on image data, and a facsimile machine, and includes an image scanning function, a copying function and a facsimile transmission reception function. While the MFP 100 is described as an example of the information processing apparatus in the present embodiment, the information processing apparatus may be a printer or a facsimile machine each having an image forming function.

The network 2 is a Local Area Network (LAN), either wired or wireless. Further, the network 2 is not limited to the LAN and may be a Wide Area Network (WAN), the Internet or the like. The MFP 100, 100A, 100B, 100C can communicate with one another via the network 2, and each of the MFPs 100, 100A, 100B, 100C can communicate with the authentication server 200 via the network 2.

The authentication server 200 is a general computer. The hard configuration and the functions of the authentication server 200 are known. Therefore, a description thereof will not be repeated.

The MFP 100 includes an antenna 118A, which is an electrode laid on a floor surface in a predetermined range in its vicinity. The portable device 250 includes at least a memory and a data communication unit that performs human body communication with each of the MFPs 100, 100A, 100B, 100C. The portable device 250 stores unique device identification information assigned to the portable device 250 in the memory. When a user who carries the portable device 250 is present on the antenna 118A of the MFP 100, the portable device 250 can perform the human body communication with the MFP 100 via a body of the user and the antenna 118A.

The portable device 250 is attached to a nameplate worn by the user or a card, for example. As long as including a communication unit for the human body communication, the portable device 250 may be a device for an exclusive purpose, or may be incorporated in a PDA (Personal Digital Assistant), a mobile phone or the like.

As a human body communication technology, various types of methods such as a current method for allowing a weak current to flow in a human body when a person touches an electrode and modulating the current for transmission of information, an electric field method for giving a change in the electric field along a surface of the human body for communication, an acoustic wave method for using an ultrasonic wave as a transmission medium have been developed. However, the human body communication technology is not limited to them. The case where the electric field method is used is described here as an example of the human body communication technology.

When becoming communicable with the portable device 250, the MFP 100 receives device identification information for identifying the device from the portable device 250 and transmits an authentication request including the device identification information to the authentication server 200. The device identification information received from the portable device 250 is the authentication information for authenticating the user.

Users permitted to use each of the MFPs 100, 100A, 100B, 100C are registered in the authentication server 200. The authentication server 200 performs authentication of a user based on an authentication request received from any of the MFPs 100, 100A, 100B, 100C and returns a result of authentication. As for an operation of the authentication server 200, the case where an authentication request is received from the MFP 100 will be described here as an example. In the authentication server 200, a user record, which associates the user identification information for identifying a user permitted to use the MFP 100 with the device identification information of the portable device 250 assigned to the user, is stored in advance. In response to the reception of the authentication request from the MFP 100, if the user record including the device identification information included in the authentication request is stored, the authentication server 200 authenticates the user associated with the device identification information by the user record. If the user record including the device identification information included in the authentication request is not stored, the authentication server 200 does not authenticate the user based on the device identification information. The authentication server 200 returns a result of authentication to the MFP 100, which has transmitted the authentication request. The result of authentication indicating that the user is authenticated includes the device identification information included in the authentication request and the user identification information of the authenticated user.

Figure 2:
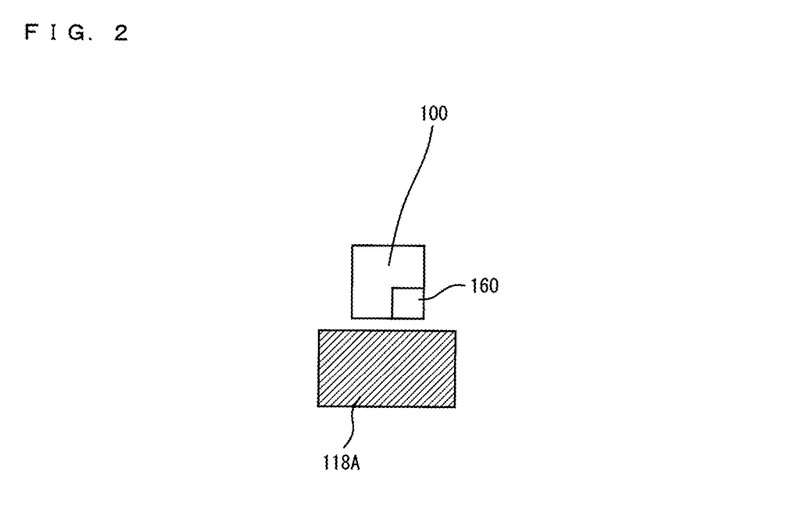
FIG. 2 is a diagram showing one example of a range of an antenna included in an MFP.

FIG. 2 is a diagram showing one example of a range of the antenna included in the MFP. FIG. 2 is a diagram of the MFP 100 as viewed from above. Referring to FIG. 2, the antenna 118A is laid on a floor surface close to an operation panel 160 and a front side of a main body of the MFP 100.

The antenna 118A is laid close to the front surface of the MFP 100. A positional relationship between the antenna 118A and the main body of the MFP 100 depends on an environment in which the MFP 100 is provided. The antenna 118A may be arranged on a floor surface on which a user who operates the MFP 100 can be positioned in the case where the user operates the operation panel 160.

Figure 3:
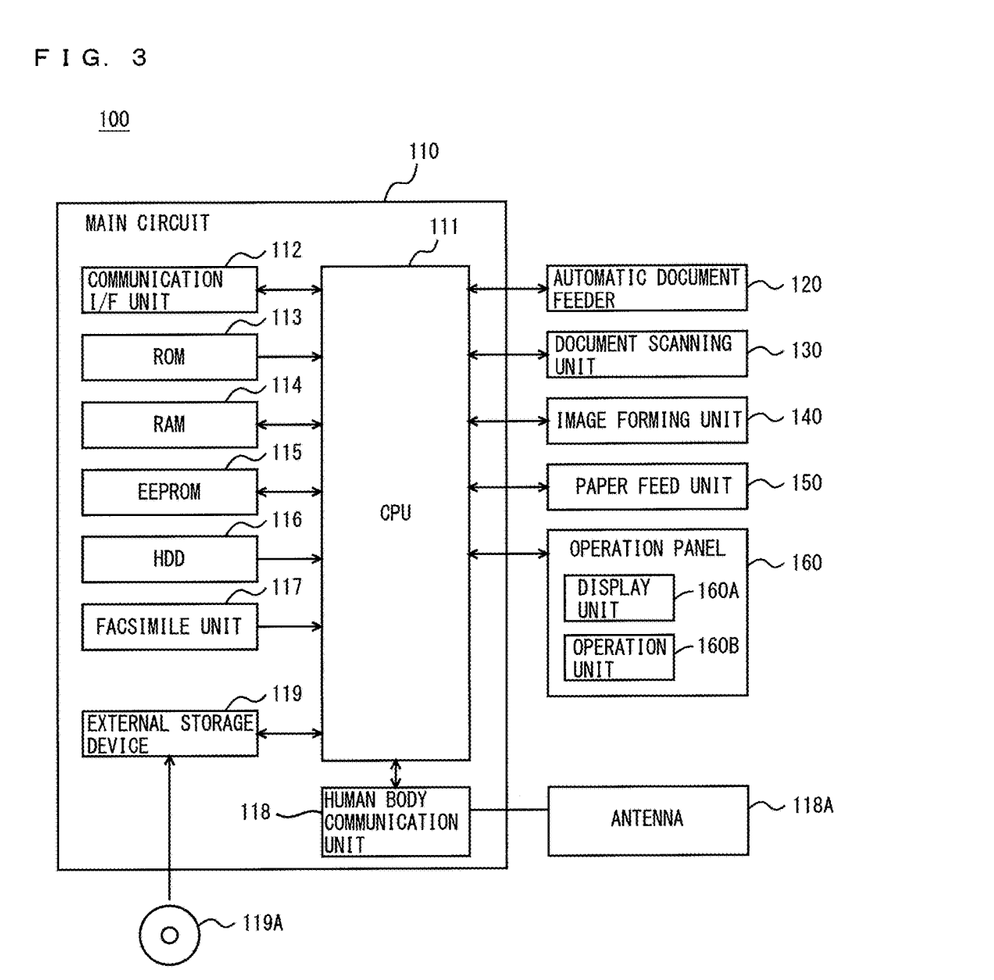
FIG. 3 is a block diagram showing one example of a hardware configuration of the MFP.

FIG. 3 is a block diagram showing one example of a hardware configuration of the MFP. Referring to FIG. 3, the MFP 100 includes a main circuit 110, a document scanning unit 130 for scanning a document, an automatic document feeder 120 for transporting a document to the document scanning unit 130, an image forming unit 140 for forming a still image, which is output by the document scanning unit 130 when the document scanning unit 130 scans a document, on a sheet of paper or other medium, a paper feed unit 150 for supplying a sheet of paper to the image forming unit 140, an operation panel 160 as a user interface and the antenna 118A.

The automatic document feeder 120 automatically transports a plurality of documents set on a document feed tray to a predetermined document scanning position set on a platen glass of the document scanning unit 130 one by one, and discharges the document of which a document image is scanned by the document scanning unit 130 onto a document discharge tray.

The document scanning unit 130 includes a light source that irradiates the document transported to the document scanning position with light, and an optoelectronic transducer that receives the light reflected by the document, and scans the document image according to a size of the document. The optoelectronic transducer converts the received light into image data, which is an electric signal, and outputs the image data to the image forming unit 140. The paper feed unit 150 transports a sheet of paper stored in the paper feed tray to the image forming unit 140.

The image forming unit 140 forms an image by a well-known electrophotographic method, and forms an image on the sheet of paper transported by the paper feed unit 150 based on print data on which a data process is performed, print data that is externally received or print data stored in the HDD 116. The data process includes various data processes such as shading correction performed on the image data received from the document scanning unit 130. The image forming unit 140 discharges the sheets of paper on which images are formed onto the document discharge tray.

The main circuit 110 includes a CPU 111, a communication interface (I/F) unit 112, a ROM (Read Only Memory) 113, a RAM (Random Access Memory) 114, an EEPROM (Electrically Erasable and Programmable ROM) 115, a hard disc drive (HDD) 116 as a mass storage device, a facsimile unit 117, a human body communication unit 118 for performing the human body communication and an external storage device 119 on which a CD-ROM (Compact Disc-Read Only Memory) 119A is mounted.

The CPU 111 is connected to the automatic document feeder 120, the document scanning unit 130, the image forming unit 140, the paper feed unit 150 and the operation panel 160, and controls the entire MFP 100. The ROM 113 stores a program executed by the CPU 111 and necessary data for execution of the program. The RAM 114 is used as a work area when the CPU 111 executes a program. Further, the RAM 114 temporarily stores a still image continuously sent from the document scanning unit 130. The operation panel 160 is provided close to the front surface of the MFP 100 and includes a display unit 160A and an operation unit 160B. The display unit 160A is a display device such as a liquid crystal display device (LCD) and an organic ELD (Electroluminescence Display) and displays instruction menus to users, information of acquired image data and the like. The operation unit 160B includes a plurality of keys and accepts input of an instruction of each type, characters, numbers and the like corresponding to the keys by the operation of the user. The operation unit 160B further includes a touch panel provided on the display unit 160A.

The communication I/F unit 112 is an interface for connecting the MFP 100 to the network 2. The CPU 111 communicates with the PC 200 and the other MFPs 100A, 100B, 100C via the communication I/F unit 112, and transmits and receives data. Further, the communication I/F unit 112 communicates with another computer connected to the Internet via the network 2, and transmits and receives data.

The facsimile unit 117 is connected to the Public Switched Telephone Networks (PSTN) to transmit facsimile data to or receive facsimile data from the PSTN. The facsimile unit 117 stores the received facsimile data in the HDD 116 or outputs the received facsimile data to the image forming unit 140. The image forming unit 140 prints the facsimile data received from the facsimile unit 117 on a sheet of paper. Further, the facsimile unit 117 converts the data stored in the HDD 116 into the facsimile data and transmits the facsimile data to a facsimile device connected to the PSTN.

The human body communication unit 118 is connected to the antenna 118A. In the case where a user who carries the portable device 250 is present on the antenna 118A, the human communication unit 118 uses the antenna 118A and a body of the user as communication mediums and communicates with the portable device 250 via the antenna 118A and the body of the user.

The external storage device 119 is mounted with the CD-ROM 119A. The CPU 111 can access the CD-ROM 119A via the external storage device 119. The CPU 111 loads the program recorded in the CD-ROM 119A, which is mounted on the external storage device 119, into the RAM 114 for execution. The program executed by the CPU 111 is not limited to the program recorded in the CD-ROM 119A, and the program stored in the HDD 116 may be loaded into the RAM 114 for execution. In this case, another computer connected to the network 2 may rewrite the program stored in the HDD 116 of the MFP 100, or may additionally write a new program therein. Further, the MFP 100 may download a program from another computer connected to the network 2 and store the program in the HDD 116. The program referred to here includes not only a program directly executable by the CPU 111 but also a source program, a compressed program, an encrypted program and the like.

The medium for storing the program executed by the CPU 111 is not limited to the CD-ROM 119A. It may be an optical disc (MO (Magnetic Optical Disc)/MD (Mini Disc)/DVD (Digital Versatile Disc)), an IC card, an optical card, or a semiconductor memory such as a mask ROM, an EPROM (Erasable Programmable ROM) or an EEPROM (Electrically EPROM).

Figure 4:
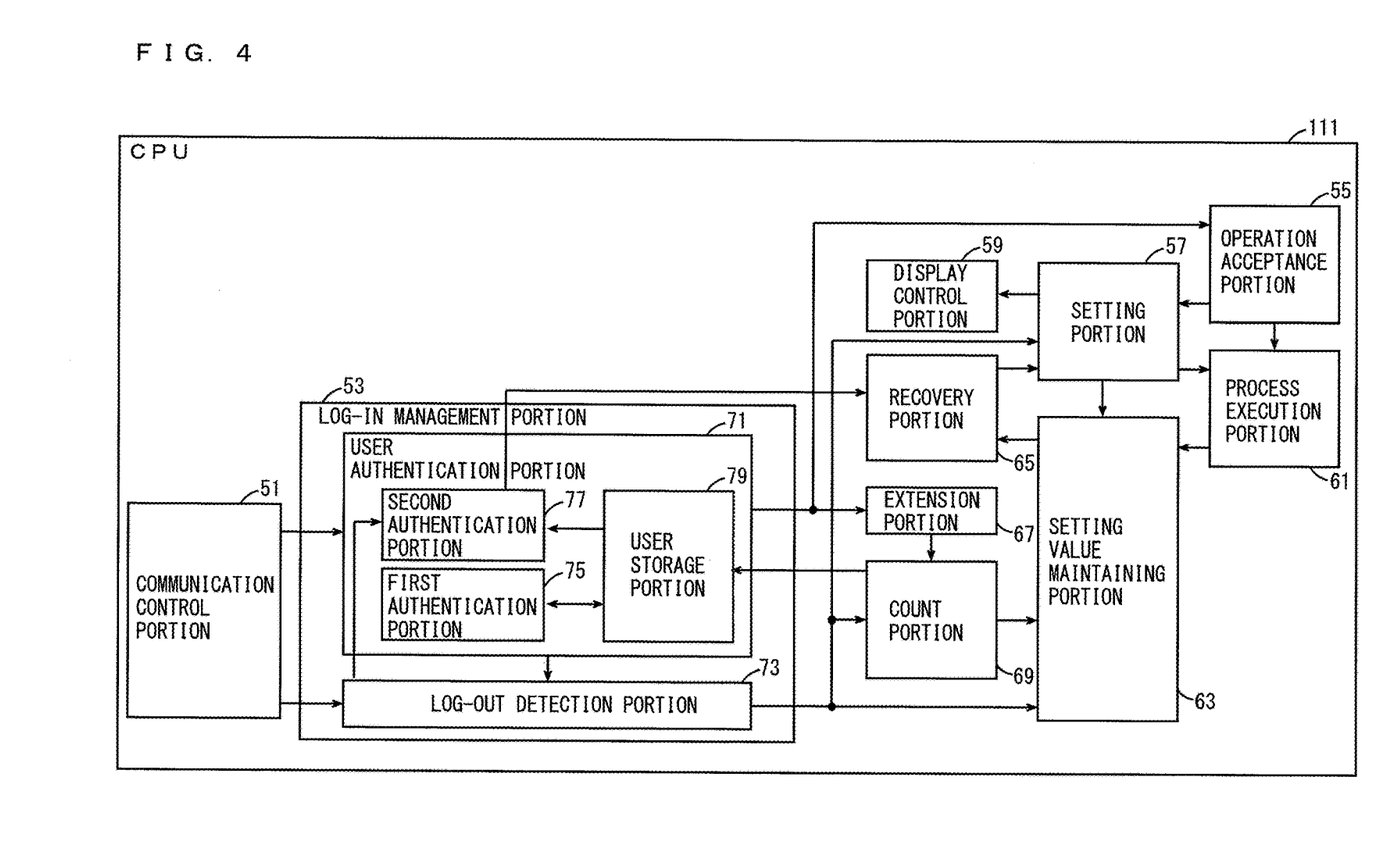
FIG. 4 is a block diagram showing one example of functions of a CPU included in the MFP.

FIG. 4 is a block diagram showing one example of the functions of the CPU included in the MFP. The functions shown in FIG. 4 are the functions realized by the CPU 111 in the case where the CPU 111 included in the MFP 100 executes a setting continuation program stored in the ROM 103, the EEPROM 115, the HDD 116 or the CD-ROM 119A.

Referring to FIG. 4, the CPU 111 includes a communication control portion 51 for controlling the human body communication unit 118, a log-in management portion 53 that manages a user who is logged in, an operation acceptance portion 55 that controls the operation unit 160B, a setting portion 57 that sets a setting value, a display control portion 59 that controls the display unit 160A, a process execution portion 61 that executes a process in accordance with the setting value, a setting value maintaining portion 63, a recovery portion 65, an extension portion 67 and a count portion 69 that counts an elapsed time period from the time when the user logs out.

The communication control portion 51 controls the human body communication unit 118 and allows the human body communication unit 118 to communicate with the portable device 250. Specifically, the communication control portion 51 allows the human body communication unit 118 to regularly output a transmission request of the device identification information. When the human body communication unit 118 receives the device identification information transmitted by the portable device 250, which has received the transmission request, the communication control portion 51 accepts the device identification information from the human body communication unit 118. Only when a user who carries the portable device 250 is present on the antenna 118A, the human body communication unit 118 can communicate with the portable device 250. Therefore, when accepting the device identification information from the human body communication unit 118, the communication control portion 51 detects that the user who carries the portable device 250 is present on the antenna 118A. When accepting the device identification information from the human body communication unit 118, the communication control portion 51 outputs the accepted device identification information to the log-in management portion 53.

Further, after the human body communication unit 118 receives the device identification information, the communication control portion 51 continuously allows the human body communication unit 118 to regularly output the transmission request of the device identification information, and accepts the device identification information from the human body communication unit 118 each time the human body communication unit 118 receives the device identification information transmitted by the portable device 250, which has received the transmission request. Thus, the communication control portion 51 can detect that the user who carries the portable device 250 is no longer present on the antenna 118A. In other words, the communication control portion 51 can detect that the user who carries the portable device 250 is present on the antenna 118A. During a period in which the device identification information is accepted from the human communication unit 118, the communication control portion 51 outputs the device identification information to the log-in management portion 53 each time the communication control portion 51 accepts the device identification information from the human body communication unit 118.

The log-in management portion 53 includes a user authentication portion 71 and a log-out detection portion 73. The user authentication portion 71 authenticates the user who carries the portable device 250 based on the device identification information received from the communication control portion 51. The user authentication portion 71 includes a first authentication portion 75, a second authentication portion 77 and a user storage portion 79.

In response to reception of the device identification information from the communication control portion 51, the first authentication portion 75 transmits an authentication request including the device identification information received from the communication control portion 51 to the authentication server 200 via the communication I/F unit 112. As described above, in the case where authenticating the user by using the device identification information included in the authentication request, the authentication server 200 that receives the authentication request returns a result of authentication including the user identification information and the device identification information. In the case where not authenticating the user, the authentication server 200 returns a result of authentication indicating that the user is not authenticated. In the case where the communication I/F unit 112 receives a result of authentication including the user identification information and the device identification information from the authentication server 200, the first authentication portion 75 outputs a set of the user identification information and the device identification information included in the result of authentication to the user storage portion 79 and the log-out detection portion 73, and outputs the user identification information to the operation acceptance portion 55 and the extension portion 67.

In response to reception of the set, of the user identification information and the device identification information, from the first authentication portion 75, the user storage portion 79 stores the set, of the user identification information and the device identification information, in the RAM 114. When receiving a deletion instruction from the count portion 69, described below, the user storage portion 79 deletes a set, of user identification information and device identification information, including the user identification information that is the same as the user identification information included in the deletion instruction from among sets, of user identification information and device identification information, stored in the RAM 114. In other words, the user storage portion 79 stores the set, of the user identification information and the device identification information, included in the result of authentication received from the first authentication portion 75 until receiving the deletion instruction from the count portion 69.

The log-out detection portion 73 detects the log-out of the user who has been authenticated by the user authentication portion 71. After receiving the set, of the user identification information and the device identification information, from the first authentication portion 75, when no longer receiving the same device identification information from the communication control portion 51, the log-out detection portion 73 detects the log-out of the user specified by the user identification information that makes a set with the device identification information. In the case where detecting the log-out of the user, the log-out detection portion 73 outputs a set, of the user identification information of the logged-out user and the device identification information, to the second authentication portion 77 and outputs the user identification information of the logged-out user to the setting portion 57, the count portion 69 and the setting value maintaining portion 63.

In the case where receiving the device identification information from the communication control portion 51, if the device identification information, which is the same as the device identification information received from the communication control portion 51, is stored in the RAM 114 by the user storage portion 79, the first authentication portion 75 does not transmit the authentication request to the authentication server 200.

In response to reception of the device identification information from the communication control portion 51, the second authentication portion 77 authenticates the user based on the set, of the user identification information and the device identification information, stored in the RAM 114 by the user storage portion 79. Specifically, after receiving the set, of the user identification information of the logged-out user and the device identification information, from the log-out detection portion 73, in the case where receiving the same device identification information for the first time, the second authentication portion 77 determines whether a set, of the user identification information and the device identification information, including the device identification information that is the same as the device identification information received from the communication control portion 51 is stored in the RAM 114 by the user storage portion 79. If the set, of the user identification information and the device identification information, including the device identification information that is the same as the device identification information received from the communication control portion 51 is stored in the RAM 114, the second authentication portion 77 authenticates the user specified by the user identification information. If the set, of the user identification information and the device identification information, including the device identification information that is the same as the device identification information received from the communication control portion 51 is not stored in the RAM 114, the second authentication portion 77 does not authenticate the user.

In the case where authenticating the user, the second authentication portion 77 outputs the set, of the user identification information of the authenticated user and the device identification information, to the log-out detection portion 73, and outputs the user identification information of the authenticated user to the recovery portion 65, the operation acceptance portion 55 and the extension portion 67. Because the first authentication portion 75 requests the authentication server 200 to perform authentication, the time is required for transmission of the authentication request, and also a processing time period is required for the authentication performed by the authentication server 200. The second authentication portion 77 performs the authentication based on the set, of the user identification information and the device identification information, stored in the RAM 114 by the user storage portion 79. Therefore, between the time required for the authentication performed by the first authentication portion 75 and the time required for the authentication performed by the second authentication 77, the time required for the authentication performed by the second authentication portion 77 is shorter. Therefore, the authentication is performed by the second authentication portion 75 until a predetermined time period elapses since the user authenticated by the first authentication portion 75 logs out from the MFP 100, so that the response time can be reduced.

The count portion 69 counts an elapsed time period from the time when the user logs out. When the elapsed time period from the time of the log-out is a threshold value or more, the count portion 69 outputs the deletion instruction to the user storage portion 79. The deletion instruction includes the user identification information of the user who has not been logged in in a predetermined time period or more since the time of the log-out.

The extension portion 67 changes the threshold value used by the count portion 69 to a value increased by a time period during which a user who is other than the logged-out user is logged in. In the case where the threshold value is changed by the extension portion 67, when the elapsed time period from the time of the log-out of the user is the changed threshold value or more, the count portion 69 outputs the deletion instruction to the user storage portion 79.

Specifically, the extension portion 67 receives the user identification information of the logged-in user from any of the first authentication portion 75 and the second authentication portion 77 included in the user authentication portion 71. In response to reception of the user identification information of the logged-in user from any of the first authentication portion 75 and the second authentication portion 77, the extension portion 67 outputs an extension start instruction including the user identification information of the logged-in user to the count portion 69.

In response to reception of the user identification information of the logged-out user from the log-out detection portion 73, the count portion 69 starts counting a time count corresponding to the user identification information. In the case where receiving the extension start instruction from the extension portion 67, the count portion 69 temporarily stops counting the time count corresponding to the user identification information that is different from the user identification information included in the extension start instruction. Further, in the case where receiving the user identification information of the logged-out user from the log-out detection portion 73, the count portion 69 restarts counting the time count corresponding to the user identification information, which is different from the user identification information of the logged-out user, received from the log-out detection portion 73 among the time counts for which the counting is temporarily stopped. In the case where a time count value of the time count is the threshold value or more, the count portion 69 outputs a deletion instruction, including the user identification information corresponding to the time count, to the user storage portion 79 and the setting value maintaining portion 63.

For example, in the case where a user A logs out, the count portion 69 receives user identification information of the user A from the log-out detection portion 73. In response to the reception of the user identification information of the user A from the log-out detection portion 73, the count portion 69 starts counting a time count A corresponding to the user A. Thereafter, in the case where a user B logs in, the extension portion 67 outputs an extension start instruction including user identification information of the user B to the count portion 69. In response to the reception of the extension start instruction including the user identification information of the user B, the count portion 69 temporarily stops counting the time count A corresponding to the user A. A time count value at this time point is T1. Next, when the user B logs out, the count portion 69 receives the user identification information of the user B from the log-out detection portion 73. In response to the reception of the user identification information of the user B from the log-out detection portion 73, the count portion 69 starts counting a time count B corresponding to the user B, cancels the temporary stop of counting of the time count A corresponding to the user A, and starts counting from the time count value T1. Thus, a value of the threshold value is increased by a period during which the count portion 69 temporarily stops counting the time count A. When the time count value of the time count A is the predetermined threshold value or more, the count portion 69 outputs a deletion instruction including the user identification information of the user A to the user storage portion 79.

The operation acceptance portion 55 is connected to the operation unit 160B and accepts an operation of inputting to the operation unit 160B by the user. The operations accepted by the operation acceptance portion 55 include an operation of pressing any of the hard keys included in the operation unit 160B and an operation of designating a position on the touch panel included in the operation unit 160B. The operations accepted by the operation unit 160B includes a setting operation of setting a setting value, an execution instruction operation of giving an instruction to execute a process, an end instruction operation of giving an instruction to end a repetition process, and a screen switch operation of switching the operation screens. The operation acceptance portion 55 determines the operation that is accepted after the input of the user identification information of the logged-in user from any of the first authentication portion 75 and the second authentication portion 77 included in the user authentication portion 71 as an operation performed by the user who is identified by the user identification information. In the case where accepting the execution instruction operation, the operation acceptance portion 55 outputs a set, of the execution instruction operation and the user identification information, to the process execution portion 61. In the case where accepting the end instruction operation, the operation acceptance portion 55 outputs a set, of the end instruction operation and the user identification information, to the process execution portion 61.

The display control portion 59 controls the display unit 160A and displays an operation screen in the display unit 160A. In response to acceptance of the screen switch operation by the operation acceptance portion 55, the display control portion 59 displays the operation screen specified by the screen switch operation in the display unit 160A. The operation screen includes a setting value display region in which a setting value is displayed. The user can operate the operation unit 160B in accordance with the operation screen displayed in the display unit 160A and change the setting value displayed in the setting value display region included in the display screen.

In response to reception of the user identification information of the logged-out user from the log-out detection portion 73, the setting portion 57 sets the setting value to a default setting value. The setting portion 57 sets the setting value based on the setting operation accepted by the operation acceptance portion 55. Specifically, the setting portion 57 determines the setting value based on the operation accepted by the operation acceptance portion 55 and changes the set setting value to the determined setting value.

The process execution portion 61 controls at least one of the document scanning unit 130, the automatic document feeder 120, the image forming unit 140, the paper feed unit 150, the HDD 116, the facsimile unit 117 and the external storage device 119 and executes a process. In response to acceptance of the execution instruction operation by the operation acceptance portion 55, the process execution portion 61 executes a process defined by the execution instruction operation based on a setting value set by the setting portion 57. The processes executable by the process execution portion 61 include a one-off process which is executed once for one execution instruction operation and a repetition process of repeating a one-off process until the end instruction operation is accepted.

In the case where receiving a set, of the user identification information and the execution instruction operation, from the operation acceptance portion 55, if the process specified by the execution instruction operation is a one-off process, the process execution portion 61 outputs an end instruction including the user identification information received from the operation acceptance portion 55 to the setting value maintaining portion 63. If the process specified by the execution instruction operation is a repetition process, the process execution portion 61 does not output the end instruction to the setting value maintaining portion 63. In the case where receiving a set, of the user identification information and the execution instruction operation, from the operation acceptance portion 55, if the process specified by the execution instruction operation is a repetition process, in response to next reception of a set, of the user identification information and the end instruction operation, from the operation acceptance portion 55, the process execution portion 61 outputs an end instruction including the user identification information received from the operation acceptance portion 55 to the setting value maintaining portion 63.

In response to reception of the user identification information of the logged-out user from the log-out detection portion 73, the setting value maintaining portion 63 stores a set, of the user identification information and the setting value set by the setting portion 57, in the RAM 114. When receiving a deletion instruction from the count portion 69, the setting value maintaining portion 63 deletes the set, of the user identification information and the setting value, including the user identification information that is the same as the user identification information included in the deletion instruction from among sets, of the user identification information and the setting value stored in the RAM 114, from the RAM 114. In other words, the setting value maintaining portion 63 stores a set, of the setting value that had been set by the user (who logs out afterwards) before the user logs out and the user identification information of the logged-out user, until an elapsed time period from the time of the log-out is the threshold value or more.

In the case where receiving user identification information of a user who is authenticated by the second authentication portion 77, the recovery portion 65 determines whether a set, including the user identification information that is the same as the user identification information received from the second authentication portion 77, is present among sets, of the user identification information and the setting value, stored by the setting value maintaining portion 63. If the setting value, which makes the set with the user identification information that is the same as the user identification information received from the second authentication portion 77, is stored in the RAM 114 by the setting value maintaining portion 63, the recovery portion 65 updates a setting value that is set by the setting portion 57 with the setting value.

Figure 5:
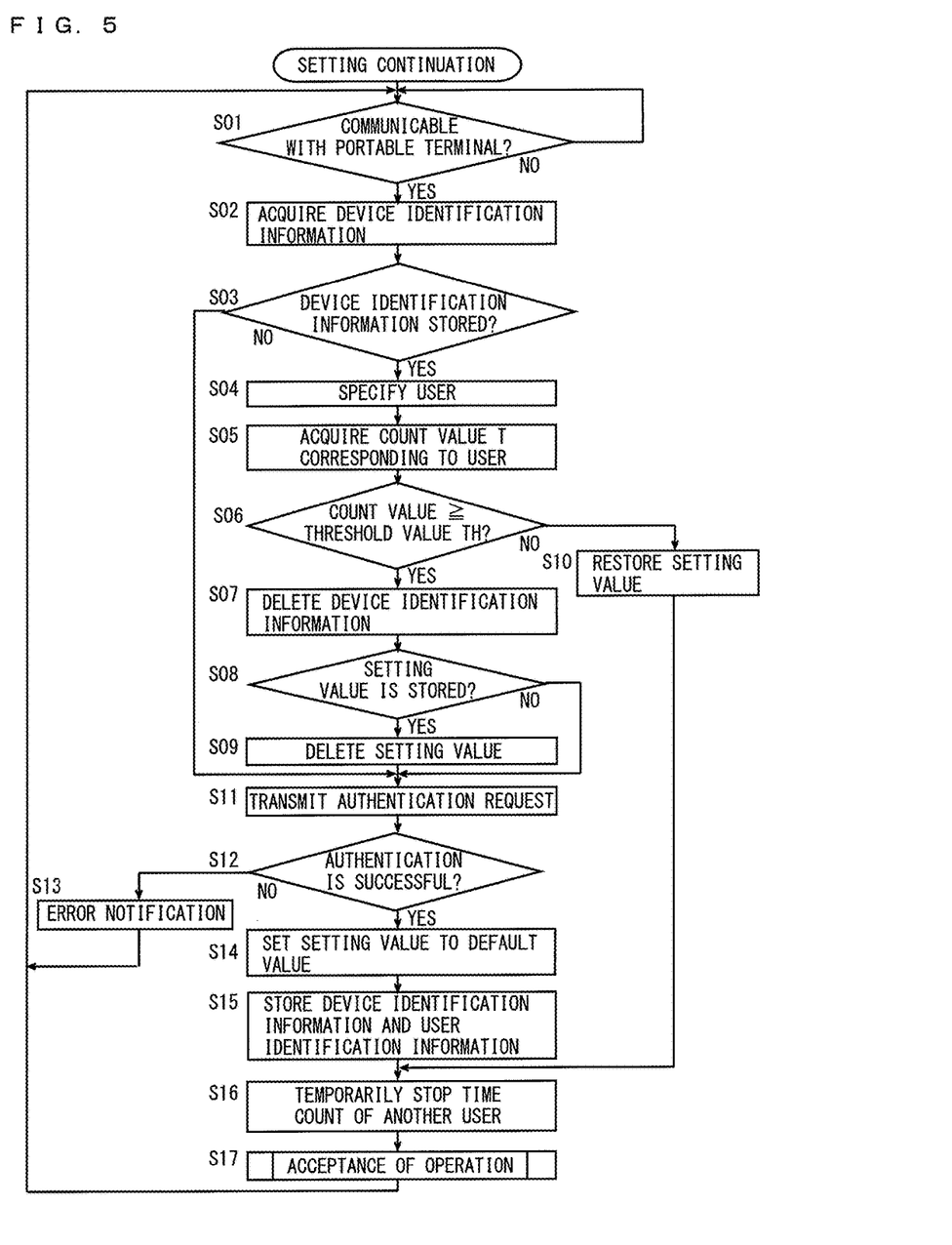
FIG. 5 is a flow chart showing one example of a flow of a setting continuation process.

FIG. 5 is a flow chart showing one example of a flow of a setting continuation process. The setting continuation process is a process executed by the CPU 111 in the case where a setting continuation program stored in the ROM 103, the EEPROM 115, the HDD 116 or the CD-ROM119A is executed by the CPU 111 included in the MFP 100.

Referring to FIG. 5, the CPU 111 determines whether the MFP 100 has become communicable with the portable device 250 (step S01). The process waits until the MFP 100 becomes communicable with the portable device 250 (NO in the step S01). If the MFP 100 is communicable with the portable device 250 (YES in the step S01), the process proceeds to the step S02. In other words, the setting continuation process is a process that is executed in response to the MFP 100 being communicable with the portable device 250.

In the step S02, the CPU 111 acquires the device identification information received from the portable device 250, and the process proceeds to the step S03. The process from the step S03 to the step S10 will be described below.

In the step S11, the CPU 111 transmits the authentication request to the authentication server 200, and the process proceeds to the step S12. The authentication request includes the device identification information acquired in the step S02. The authentication server 200 stores a user table that associates the user identification information of the user who is permitted to use the MFP 100 with the device identification information of the portable device 250 that is assigned to the user. In the case where the authentication server 200 receives the authentication request, if the device identification information, which is the same as the device identification information included in the authentication request, is stored in the user table, the authentication server 200 authenticates the user identified by the user identification information associated with the device identification information. If the device identification information, which is the same as the device identification information included in the authentication request, is not stored in the user table, the authentication server 200 does not authenticate the user. In the case where the authentication is successful, the authentication server 200 returns a result of authentication including the user identification information of the authenticated user and the device identification information. In the case where the authentication is unsuccessful, the authentication server 200 returns a result of authentication indicating the authentication failure.

In the step S12, the process branches in accordance with the result of authentication returned from the authentication server 200. If the result of authentication indicates the authentication success, the process proceeds to the step S14. If not, the process proceeds to the step S13. In the step S13, the user is notified of an error, and the process returns to the step S01. For example, the CPU 111 notifies the user of the error by displaying an error message, indicating that the user is not authorized to use the MFP 100, in the display unit 160A.

In the step S14, a setting value is set to a default value, and the process proceeds to the step S15. In the step S15, the CPU 111 stores a set, of the user identification information and the device identification information, included in the result of authentication received from the authentication server 200 in the step S12 in the RAM 114, and the process proceeds to the step S16.

In the step S16, counting of a time count of another user is temporarily stopped, and the process proceeds to the step S17. In the step S17, the operation acceptance process is executed, and the process returns to the step S01. Details of the time count of the other user and the operation acceptance process will be described below.

Figure 6:
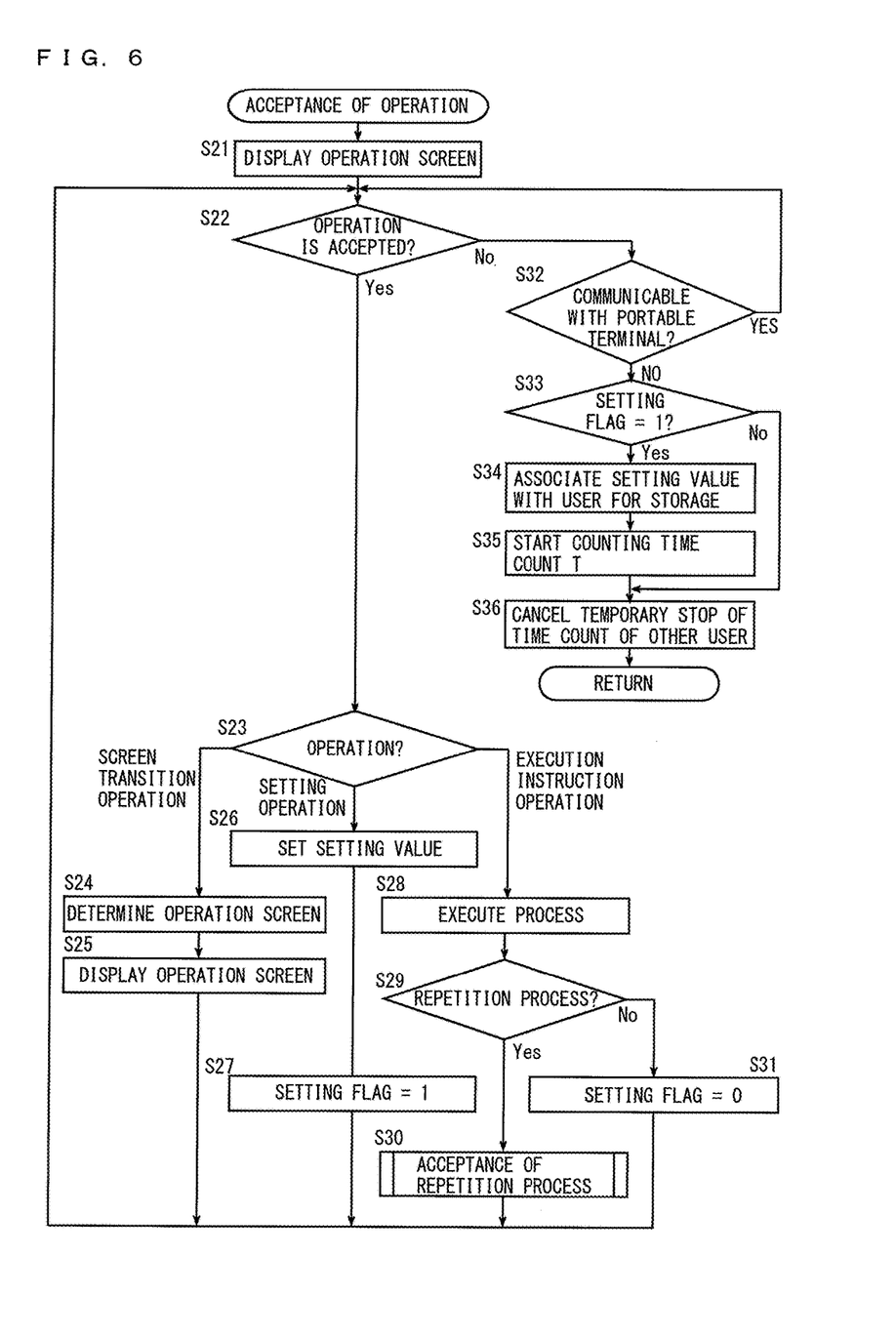
FIG. 6 is a flow chart showing one example of a flow of an operation acceptance process.

FIG. 6 is a flow chart showing one example of a flow of the operation acceptance process. The operation acceptance process is a process executed in the step S17 of FIG. 5. Referring to FIG. 6, the CPU 111 displays an operation screen in the display unit 160A (step S21). One operation screen among a plurality of operation screens stored in the HDD 116 is displayed in the display unit 160A. The operation screen defined by the setting value among the plurality of operation screens is displayed.

In the step S22, whether an operation is accepted is determined. If the operation is accepted by the operation unit 160B, the process proceeds to the step S23. If not, the process proceeds to the step S32. In the step S23, the process branches depending on the accepted process. In the case where a screen transition operation is accepted, the process proceeds to the step S24. In the case where a setting operation is accepted, the process proceeds to the step S26. In the case where an execution instruction operation is accepted, the process proceeds to the step S28.

In step S24, an operation screen specified by the screen transition operation is determined, and the process proceeds to the step S25. In the step S25, the determined operation screen is displayed in the display unit 160A, and the process returns to the step S22. In the step S26, a setting value specified by the setting operation is set, and the process proceeds to the step S27. In the step S27, a setting flag is set to "1", and the process returns to the step S22. The setting flag is a flag indicating whether an operation by the user is completed. In the case where the operation by the user is completed, "0" is set. In the case where the operation by the user is not completed, "1" is set.

In the step S28, the CPU 111 executes the process specified by the execution instruction operation in accordance with the setting value, and the process proceeds to the step S29. In the step S29, whether the process specified by the execution instruction operation is the repetition process is determined. If the process is the repetition process, the process proceeds to the step S30. If not, the process proceeds to the step S31. In the step S30, a repetition operation acceptance process is executed, and the process returns to the step S22. In the step S31, the setting flag is set to "0", and the process returns to the step S22.

In the step S32, whether the MFP 100 is communicable with the portable device 250 is determined. If the MFP 100 is communicable with the portable device 250, the process returns to the step S22. If not, the process proceeds to the step S33. In the step S33, whether the setting flag is set to "1" is determined. If the setting flag is set to "1", the process proceeds to the step S34. If not, the process proceeds to the step S36.

In the step S34, the CPU 111 associates the setting value that is set at that time point with the user for storage, and the process proceeds to the step S35. Specifically, a set, of the setting value and the user identification information of the user who is permitted to log in, is stored in the RAM 114. In the step S35, the CPU 111 starts counting a time count T corresponding to the user who is permitted to log in, and the process proceeds to the step S36. In the step S36, the temporary stop, performed in the step S26 of FIG. 5, of counting of a time count corresponding to another user is canceled, and the process returns to the setting continuation process.

Returning to FIG. 5, when acquiring the device identification information from the portable device 250 in the step S02, the CPU 111, in the step S3, determines whether the device identification information, which is the same as the device identification information received from the portable device 250 in the step S02, is stored in the RAM 114. In the step S03, the device identification information stored in the RAM 114 is the device identification information of the portable device 250 assigned to the user authenticated by the authentication server 200. In the step S03, if the device identification information, which is the same as the device identification information received from the portable device 250 in the step S02, is stored in the RAM 114, the process proceeds to the step S04. If not, the process proceeds to the step S11.

In the step S04, the user is specified, and the process proceeds to the step 505. The CPU 111 specifies the user identified by the user identification information that makes a set with the device identification information received from the portable device 250 as the authenticated user based on the set, of the device identification information and the user identification information, stored in the RAM 114.

In the step S05, a time count value of the time count T corresponding to the user is acquired. In the step S35 shown in FIG. 6, the CPU 111 starts counting the time count T when the MFP 100 can no longer communicate with the portable device 250. In other words, the time count T corresponding to the user is an elapsed time period from the time when the user logs out from the MFP 100. However, in the step S14 in the setting continuation process and the step S36 of the operation acceptance process that are executed for another user, counting of the time count T is temporarily stopped during a time period in which the other user is logged in. Thus, the CPU 111 does not count the time period in which the other user is logged in.

In the next step S06, whether the time count value of the time count T corresponding to the user is the threshold value TH or more is determined. If the time count value of the time count T is the threshold value TH or more, the process proceeds to the step S07. If not, the process proceeds to the step S10. In the step S10, the setting value is restored, and the process proceeds to the step S16. Specifically, the CPU 111 reads out a set, including the user identification information that is the same as the user identification information of the user specified in the step S04, among the sets of the user identification information and the setting value stored in the RAM 114, and sets the setting value included in the read set as the setting value.

In the step S07, the device identification information that is the same as the device identification information acquired in the step S02 is deleted from the RAM 114, and the process proceeds to the step S08. A set, including the device identification information that is the same as the device identification information acquired in the step S02, among sets of the device identification information and the user identification information stored in the RAM 114 is deleted from the RAM 114.

In the step S08, whether a setting value is stored is determined. In the step S34 of the operation acceptance process shown in FIG. 6, a set, of the user identification information and the setting value, is sometimes stored in the RAM 114. If a set, of the user identification information and the setting value, including the user identification information that is the same as the user identification information of the user specified in the step S04 is stored in the RAM 114, the process proceeds to the step S09. If not, the step S09 is skipped, and the process proceeds to the step S11. In the step S09, a setting value is deleted, and the process proceeds to the step S11. Specifically, a set, including the user identification information that is the same as the user identification information of the user specified in the step S04, among sets of the user identification information and the setting value stored in the RAM 114 is deleted from the RAM 114.

Figure 7:
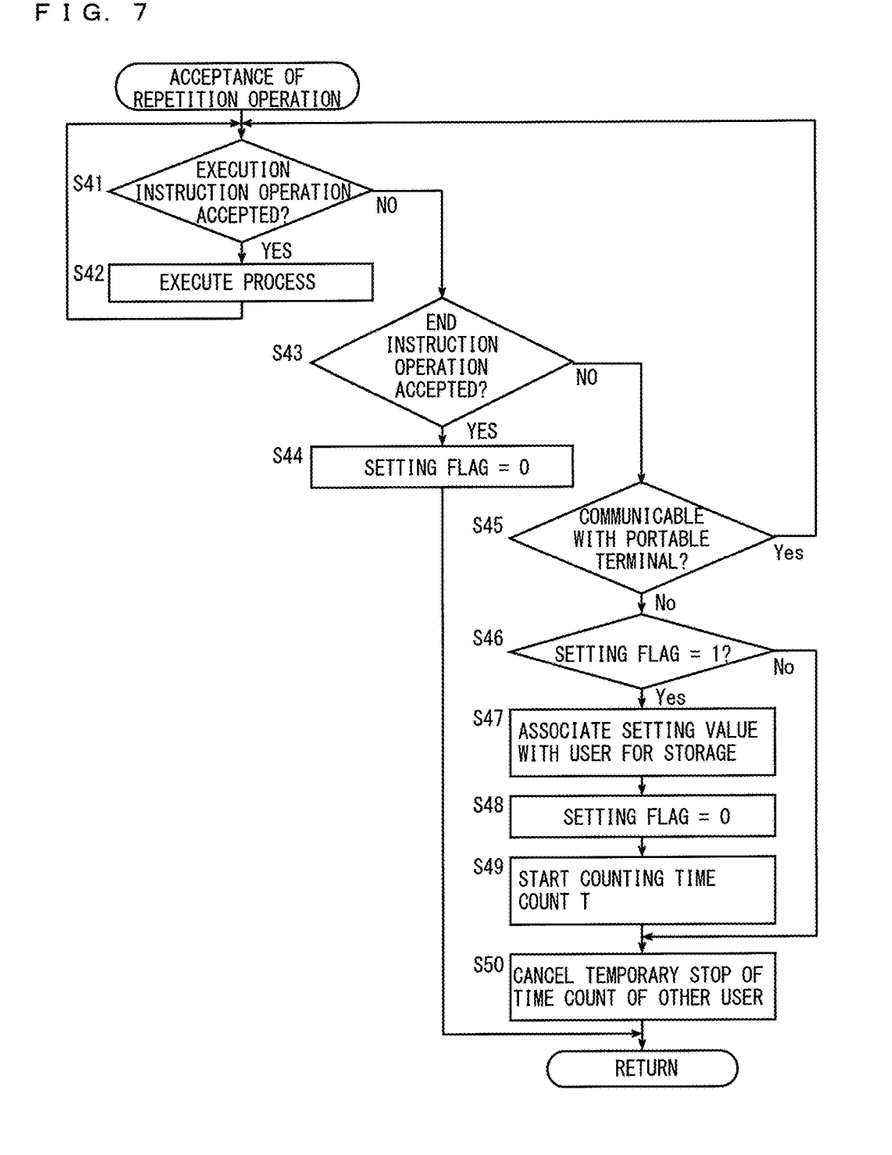
FIG. 7 is a flow chart showing one example of a flow of a repetition operation acceptance process.

FIG. 7 is a flow chart showing one example of a flow of the repetition operation acceptance process. The repetition operation acceptance process is a process executed in the step S30 of FIG. 6. Referring to FIG. 7, the CPU 111 determines whether the execution instruction operation is accepted (step S41). If the execution instruction operation is accepted, the process proceeds to the step S42. If not, the process proceeds to the step S43. In the step S42, the CPU 111 executes a process specified by the execution instruction operation in accordance with a setting value stored in the RAM 114, and the process returns to the step S41.

In the step S43, whether the end instruction operation is accepted is determined. If the end instruction operation is accepted, the process proceeds to the step S44. If not, the process proceeds to the step S45. In the step S44, the setting flag is set to "0", and the process returns to the operation acceptance process.

In the step S45, whether the MFP 100 is communicable with the portable device 250 is determined. If the MFP 100 is communicable with the portable device 250, the process returns to the step S41. If not, the process proceeds to the step S46. The process from the step S46 to the step S50 is the same as the process from the step S33 to the step S36. Thus, a description thereof will not be repeated.

<First Modified Example>

In the above-mentioned embodiment, the MFP 100 treats the device identification information of the portable device 250 as the authentication information of the user registered as the user who uses the portable device 250. When becoming communicable with the portable device 250 by the human body communication, the MFP 100 authenticates the user based on the device identification information received from the portable device 250 and permits the log-in of the user during a period in which the MFP 100 is communicable with the portable device 250. When being no longer capable of communicating with the portable device 250, the MFP 100 determines that the user has logged out.

The MFP 100 in the first modified example uses short-range communication as a communication method for the portable device 250 and the MFP 100 to communicate with each other instead of the human body communication. As a short-range communication device, a device that communicates by using a communication method in accordance with the BLE (Bluetooth (trademark) Low Energy) standards can be used. In this case, when a distance between the MFP 100 and the portable device 250 is a communicable distance or less, the MFP 100 communicates with the portable device 250. The communicable distance is several meters. Further, as the short-range communication device, a communication method of NFC (Near Field Communication) may be used. In this case, a communicable distance is several tens of centimeters.

<Second Modified Example>

Further, in the MFP 100, a proximity sensor may be provided close to the operation panel 160 and a side surface of the main body of the MFP 100. The MFP 100 may detect a user who is present close to the operation panel 160 and the side surface of the main body of the MFP 100, display a log-in screen in the display unit 160A, authenticate the user by accepting a user ID and a password input in the operation unit 160B by the user, and detect the log-out of the user in response to non-detection of the user by the proximity sensor. In this case, the MFP 100 does not need the human body communication unit 118. As the proximity sensor, an infrared sensor, a camera or the like can be used.

As described above, when the user A logs out, the MFP 100 in the present embodiment stores a setting value, which is set before the log-out, in the RAM 114. In the case where another user B logs in, the MFP 100 does not delete the setting value stored in the RAM 114 for the user A. When the user B logs out, the MFP 100 stores the setting value for the user B. Therefore, in the case where the user A logs in again, the MFP 100 reads out the setting value stored in the RAM 114 for setting. Therefore, in the case where logging in the MFP 100 again, the user A can continue with the operation, which the user A had conducted before logging out. Similarly, in the case where logging in the MFP 100 again, the user B can continue with the operation, which the user B had conducted before logging out. Therefore, the MFP 100 can allow each of the plurality of users to continue with an operation, which he/she had conducted before logging out.

Further, when the user A logs out with an operation of inputting to the MFP 100 by the user A not completed, the MFP 100 stores the setting value, which is set by the time of the log-out, in the RAM 114. In the case where the user A logs in again, the MFP 100 reads out the setting value stored in the RAM 114 for setting. A state where the operation of inputting to the MFP 100 by the user A is not completed includes a state where the user A is in the middle of inputting the setting value. In the case of a one-off process, the state where the operation of inputting to the MFP 100 by the user A is not completed includes a state before an execution instruction operation is input. In this case, in the case where logging in the MFP 100 again, the user A can continue with the setting of the setting value for execution of the one-off process. Further, in the case of a repetition process, the state where the operation of inputting to the MFP 100 by the user A is not completed is a state before a plurality of one-off processes end and a state before the end instruction operation of giving an instruction to end the repetition process is input. In this case, in the case where logging in the MFP 100 again, the user A can continuously execute the repetition process.

When the user A who operates the MFP 100 logs out from the MFP 100 with the operation of inputting to the MFP 100 completed, the MFP 100 does not store the setting value in the RAM 114. Further, when the user A logs out, the MFP 100 stores the setting value in the RAM 114 until a time period defined by a threshold value elapses since the log-out. In the case where the user A logs in after the time period defined by the threshold value has elapsed since the log-out, the setting value is not stored in the RAM 114. In this case, the MFP 100 sets a setting value to a default setting value.

Therefore, the user A can set a new setting value from the default setting value, thereby being able to easily determine the setting value.

Further, when the user A logs out, the MFP 100 stores the setting value, which is set by the time of the log-out, in the RAM 114 until a predetermined time period elapses since the user A logs out. The MFP 100 starts counting a time period during which the setting value is stored in the RAM 114 when the user A logs out. Specifically, each time the user A logs out, the MFP 100 resets a time count T and starts counting the time count T. Therefore, even in the case where the user A repeats to log in and log out several times, the user A can continue with an operation, which the user A had conducted before the last log-out as long as the user A logs in before a time period of the threshold value elapses since the log-out.

When the user A logs out, the MFP 100 stores the setting value in the RAM 114 until a time period defined by the threshold value elapses since the log-out. In the case where the other user B logs in, the MFP 100 increases the threshold value for the user A by a time period during which the other user B is logged in. Therefore, even in the case where the other user B uses the MFP 100, the user A can continue with the operation, of setting a setting value for the one-off process, which the user A had conducted before logging out. Further, the user A can allow the MFP 100 to continuously execute the repetition process, which the user A had allowed the MFP 100 to execute before logging out.

Further, after authenticating the user by the authentication server 200, the MFP 100 does not use the authentication server 200 and performs authentication by the second authentication portion 75 until a predetermined time period elapses since the log-out of the user. Therefore, the authentication performed during a period from the time when the user authenticated by the authentication server 200 logs out until the time when the predetermined time period elapses is simplified, so that the time required for authentication can be reduced.

While the MFP 100 has been described as one example of the information processing apparatus in the above-mentioned embodiment, the present invention may of course be identified as a setting continuation method for allowing the MFP 100 to execute the setting continuation process shown in FIGS. 5 to 7 and a setting continuation program for allowing the CPU 111 that controls the MFP 100 to perform the setting continuation method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information processing apparatus comprising a hardware processor that executes a process, the hardware processor being configured to:
   authenticate a user;
   during a period in which an operating user that is authenticated and logged in, accept an operation by the operating user;
   set a setting value used for execution of a process in accordance with the accepted operation;
   detect log-out of the operating user;
   in a case where the log-out is detected, associate a setting value, which is set at a time point at which the log-out is detected, with the operating user for storage in a memory;

in a case where the operating user associated with the setting value stored in the memory is authenticated by the authenticator, set a setting value to the setting value stored in the memory; and in a case where a user different from the operating user associated with the setting value stored in the memory is authenticated, not delete the stored setting value.

2. The information processing apparatus according to claim 1, wherein the hardware processor is further configured to, in the case where the log-out is detected with the operation of the authenticated operating user not completed, associate the setting value with the operating user for storage, and is configured not to, in the case where the log-out is detected with the operation of the operating user authenticated by the authenticator completed, store the setting value set by the setter.

3. The information processing apparatus according to claim 1, wherein the hardware processor is further configured to, in the case where a user different from the operating user associated with the setting value stored in the setting value maintainer is authenticated, set a setting value to a predetermined default setting value.

4. The information processing apparatus according to claim 1, wherein the hardware processor is further configured to store the setting value, which is set at the time point at which the log-out is detected, until a predetermined time period elapses since the detection of the log-out.

5. The information processing apparatus according to claim 4, wherein the hardware processor is further configured to, in the case where another user different from the operating user associated with the setting value stored in the setting value maintainer is authenticated by the authenticator, extend the predetermined time period by a time period from a time when the other user is authenticated until a time when the other user logs out.

6. The information processing apparatus according to claim 1, wherein the hardware processor is further configured to:
in response to detection of log-out, store an operating user authenticated by a first authenticator process until a predetermined time period elapses since the detection of the log-out, and
after the detection of the log-out of the operating user authenticated by the first authenticator process, authenticate the operating user stored in a storage, and
not authenticate the operating user stored in the storage.

7. The information processing apparatus according to claim 1, further comprising a communicator communicable with an information processing apparatus present in a predetermined range, wherein
the hardware processor is further configured to authenticate a user assigned to the information processing apparatus based on authentication information, which the communicator receives from the information processing apparatus, and
the hardware processor is further configured to, in response to the communicator not being communicable with the information processing apparatus after the authentication of the user, detect log-out of the operating user.

8. The information processing apparatus according to claim 7, wherein
the communicator is configured to communicate with the information processing apparatus wirelessly or while using a human body as a communication medium.

9. The information processing apparatus according to claim 1, wherein the setting value is set by the operating user for execution of the process.

10. An information processing apparatus comprising a hardware processor that executes a process,
the hardware processor being configured to:
authenticate a user;
during a period in which an operating user that is authenticated and logged in, accept an operation by the operating user;
set a setting value used for execution of a process by the hardware processor in accordance with the accepted operation;
detect log-out of the operating user;
in a case where the log-out is detected with the operation of the authenticated operating user not completed, associate a setting value, which is set at a time point at which the log-out is detected, with the operating user for storage in a memory, and configured not to, in a case where the log-out is detected with the operation of the operating user authenticated completed, store the setting value set by the setter in the memory, and
in a case where the operating user associated with the stored setting value is authenticated by the authenticator, set a setting value to the stored setting value.

11. The information processing apparatus according to claim 10, wherein
the hardware processor is further configured to, in the case where a user different from the operating user associated with the stored setting value is authenticated, set a setting value to a predetermined default setting value.

12. The information processing apparatus according to claim 10, wherein
the hardware processor is further configured to store a setting value, which is set at the time point at which the log-out is detected, until a predetermined time period elapses since the detection of the log-out.

13. The information processing apparatus, according to claim 12, wherein
the hardware processor is further configured to, in the case where another user different from the operating user associated with the stored setting value is authenticated, extend the predetermined time period by a time period from a time when the other user is authenticated until a time when the other user logs out.

14. The information processing apparatus according to claim 10, wherein the hardware processor is further configured to
in response to detection of log-out, store an operating user in the storage until a predetermined time period elapses since the detection of the log-out, and
after the detection of the log-out of the operating user, authenticate the operating user stored in the storage, and
the hardware processor is configured not to authenticate the operating user stored in the storage.

15. The information processing apparatus according to claim 10, further comprising a communicator communicable with an information processing apparatus present in a predetermined range, wherein
the hardware processor is configured to authenticate a user assigned to the information processing apparatus based on authentication information, which the communicator receives from the information processing apparatus, and the hardware processor is configured to, in response to the communicator not being communicable with the information processing apparatus after the authentication of the user by the authenticator, detect log-out of the operating user.

16. The information processing apparatus according to claim 15, wherein
the communicator is configured to communicate with the information processing apparatus wirelessly or while using a human body as a communication medium.

17. The information processing apparatus according to claim 10, wherein the setting value is set by the operating user for execution of the process.

18. A setting continuation method including:
authenticating a user;
during a period in which an authenticated operating user is logged in, accepting an operation by the operating user;
setting a setting value used for execution of a process by an information processing apparatus in accordance with the accepted operation;
detecting log-out of the operating user;
when the log-out is detected, associating a setting value, which is set at a time point at which the log-out is detected, with the operating user for storage; and
when the operating user associated with the stored setting value is authenticated, setting a setting value to the stored setting value stored, and
when a user different from the operating user associated with the stored setting value is authenticated, not deleting the stored setting value.

19. A non-transitory computer-readable recording medium encoded with a setting continuation program, wherein
the setting continuation program allows a computer that controls an information processing apparatus to perform the setting continuation method according to claim 18.

20. The non-transitory computer-readable medium encoded with the setting continuation program according to claim 19, wherein
when log-out is detected with an operation by an authenticated operating user not completed, associating the setting value with the operating user for storage, and when the log-out is detected with the operation by the authenticated operating user completed, not storing the setting value.

21. The non-transitory computer-readable medium encoded with the setting continuation program according to claim 19, wherein
when a user different from an operating user associated with a stored setting value is authenticated, setting a setting value to a predetermined default setting value.

22. The non-transitory computer-readable medium encoded with the setting continuation program according to claim 19, further comprising
storing a setting value, which is set at a time point at which log-out is detected, until a predetermined time period elapses since the detection of the log-out.

23. The non-transitory computer-readable medium encoded with the setting continuation program according to claim 19, wherein
when another user different from an operating user associated with a setting value stored is authenticated, extending the predetermined time period by a time period from a time when the other user is authenticated until a time when the other user logs out.

24. The non-transitory computer-readable medium encoded with the setting continuation program according to claim 19, wherein
authenticating the user includes
a first authentication step,
a storage step of, in response to detection of log-out, storing an operating user authenticated in the first authentication step until a predetermined time period elapses since the detection of the log-out, and
a second authentication step of, after the detection of the log-out of the operating user authenticated in the first authentication step, authenticating the operating user stored in the storage step, and
the first authentication step includes a step of not authenticating the operating user stored in the storage step.

25. The non-transitory computer-readable medium encoded with the setting continuation program according to claim 19, wherein
the information processing apparatus further includes a communicator communicable with an information processing apparatus present in a predetermined range,
authenticating the user includes a step of authenticating a user assigned to the information processing apparatus based on authentication information, which the communicator receives from the information processing apparatus, and
detecting log-out of the operating user includes a step of, in response to the communicator not being communicable with the information processing apparatus after the authentication of the user in the authentication step, detecting log-out of the operating user.

26. The non-transitory computer-readable medium encoded with the setting continuation program according to claim 25, wherein
the communicator is configured to communicate with the information processing apparatus wirelessly or while using a human body as a communication medium.

27. The method according to claim 18, wherein the setting value is set by the operating user for execution of the process.

28. A setting continuation method including:
authenticating a user;
during a period in which an authenticated operating user is logged in, accepting an operation by the operating user;
setting a setting value used for execution of a process by an information processing apparatus in accordance with the accepted operation; detecting log-out of the operating user;
when the log-out is detected with the operation by the operating user authenticated not completed, associating a setting value, which is set at a time point at which the log-out is detected, with the operating user for storage, and when the log-out is detected with the operation by the authenticated operating user completed, not storing the setting value; and
when the operating user associated with the stored setting value is authenticated, setting a setting value to the stored setting value stored.

29. A non-transitory computer-readable recording medium encoded with an setting continuation program, wherein
the setting continuation program allows a computer that controls an information processing apparatus to perform the setting continuation method according to claim 28.

30. The non-transitory computer-readable medium encoded with the setting continuation program according to claim 29, wherein
  setting the setting value includes a step of, in the case where a user different from the an operating user associated with a setting value stored is authenticated, setting a setting value to a predetermined default setting value.

31. The non-transitory computer-readable medium encoded with the setting continuation program according to claim 29, wherein
  associating the setting value includes a step of storing a setting value, which is set at a time point at which log-out is detected, until a predetermined time period elapses since the detection of the log-out.

32. The non-transitory computer-readable medium encoded with the setting continuation program according to claim 29, wherein
  associating the setting value includes a step of, in the case where another user different from an operating user associated with a stored setting value is authenticated, extending the predetermined time period by a time period from a time when the other user is authenticated until a time when the other user logs out.

33. The non-transitory computer-readable medium encoded with the setting continuation program according to claim 29, wherein
  authenticating the user includes
    a first authentication step,
    a storage step of, in response to detection of log-out in the log-out detection step, storing an operating user authenticated in the first authentication step until a predetermined time period elapses since the detection of the log-out, and
    a second authentication step of, after the detection of the log-out of the operating user authenticated in the first authentication step, authenticating the operating user stored in the storage step, and
  the first authentication step includes a step of not authenticating the operating user stored in the storage step.

34. The non-transitory computer-readable medium encoded with the setting continuation program according to claim 29, wherein
  the information processing apparatus further includes a communicator communicable with an information processing apparatus present in a predetermined range,
  the authentication step includes a step of authenticating a user assigned to the information processing apparatus based on authentication information, which the communicator receives from the information processing apparatus, and
  the log-out detection step includes a step of, in response to the communicator not being communicable with the information processing apparatus after the authentication of the user in the authentication step, detecting log-out of the operating user.

35. The non-transitory computer-readable medium encoded with the setting continuation program according to claim 34, wherein
  the communicator is configured to communicate with the information processing apparatus wirelessly or while using a human body as a communication medium.

36. The method according to claim 28, wherein the setting value is set by the operating user for execution of the process.

* * * * *